(12) United States Patent
Miyachi (10) Patent No.: US 10,148,156 B2
(45) Date of Patent: Dec. 4, 2018

(54) DRIVE DEVICE WITH MOTOR WIRES ARRANGED FOR REDUCED POSITION DETECTION ERROR

(71) Applicant: DENSO CORPORATION, Kariya, Aichi-pref. (JP)

(72) Inventor: Shuhei Miyachi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 450 days.

(21) Appl. No.: 14/553,090

(22) Filed: Nov. 25, 2014

(65) Prior Publication Data

US 2015/0155764 A1 Jun. 4, 2015

(30) Foreign Application Priority Data

Nov. 29, 2013 (JP) ................................ 2013-247471

(51) Int. Cl.
*H02K 11/215* (2016.01)
*H02K 11/21* (2016.01)
(Continued)

(52) U.S. Cl.
CPC ............. *H02K 11/215* (2016.01); *H02K 3/50* (2013.01); *H02K 11/21* (2016.01); *H02K 11/30* (2016.01); *H02K 11/33* (2016.01); *H02P 25/22* (2013.01)

(58) Field of Classification Search
CPC ........ H02K 11/33; H02K 11/30; H02K 11/38; H02K 11/048; H02K 3/50; H02K 5/225;
(Continued)

(56) References Cited

U.S. PATENT DOCUMENTS 5,631,530 A * 5/1997 Hoppe ................... G01D 5/145
318/268
2010/0201213 A1 8/2010 Kataoka et al.
(Continued)

FOREIGN PATENT DOCUMENTS

JP 7-322413 12/1995
JP H11-356024 12/1999
(Continued)

OTHER PUBLICATIONS

Office Action (1 page) dated Sep. 29, 2015 issued in corresponding Japanese Application No. 2013-247471 and English translation (2 pages).
(Continued)

*Primary Examiner* — Bernard Rojas
*Assistant Examiner* — Alexander Singh
(74) *Attorney, Agent, or Firm* — Nixon & Vanderhye P.C.

(57) ABSTRACT

A first power control system has a first to a third motor wires and a second power control system has a fourth to a sixth motor wires. The first to the third motor wires and the fourth to the sixth motor wires are located on a concentric circle of a center of a magnet and located to be symmetrical to each other with respect to the magnet. The first and the third motor wires, which are located at both sides of the second motor wire in a circumferential direction of an electric motor portion, are asymmetrically arranged with respect to the second motor wire. The fourth and the sixth motor wires, which are located at both sides of the fifth motor wire in the circumferential direction, are asymmetrically arranged with respect to the fifth motor wire. As a result, a size of an electrical driving device can be made smaller.

13 Claims, 5 Drawing Sheets

(51) Int. Cl.
  *H02K 11/30* (2016.01)
  *H02K 11/33* (2016.01)
  *H02K 3/50* (2006.01)
  *H02P 25/22* (2006.01)

(58) Field of Classification Search
  CPC ............ H02K 5/522; H02K 5/15; H02K 9/22;
       H02K 11/21; H02K 11/215; H02K 29/06;
       H02K 29/08; H01L 23/48; H01L 23/52
  USPC ............ 310/68 R, 64, 71, 68 B, 68 C, 68 D,
       310/156.05
  See application file for complete search history.

(56) References Cited

U.S. PATENT DOCUMENTS

2010/0327680 A1* 12/2010 Miyachi ............... B62D 5/0406
       310/71
  2011/0254388 A1  10/2011 Yamasaki
  2011/0254393 A1  10/2011 Yamasaki et al.
  2012/0031697 A1* 2/2012 Matsuda ............... H02K 29/08
       180/446
  2012/0098365 A1* 4/2012 Yamasaki ............ B62D 5/0406
       310/71
  2012/0098366 A1  4/2012 Yamasaki et al.
  2012/0161590 A1  6/2012 Yamasaki et al.
  2012/0307476 A1  12/2012 Masuzawa et al.
  2013/0099611 A1  4/2013 Suga et al.
  2014/0145547 A1  5/2014 Nakano et al.
  2016/0036281 A1* 2/2016 Nakano .................. H02K 29/03
       310/68 D

FOREIGN PATENT DOCUMENTS

JP     2010-051086     3/2010
  JP     2013-090376     5/2013
  WO   WO 2013/054439    4/2013

OTHER PUBLICATIONS

Hiramine et al., U.S. Appl. No. 14/553,025, filed Nov. 25, 2014.
  Hiramine et al., U.S. Appl. No. 14/553,061, filed Nov. 25, 2014.
  Matsuo et al., U.S. Appl. No. 14/553,121, filed Nov. 25, 2014.
  Tsuboi, U.S. Appl. No. 14/553,170, filed Nov. 25, 2014.

* cited by examiner

DRIVE DEVICE WITH MOTOR WIRES ARRANGED FOR REDUCED POSITION DETECTION ERROR

CROSS REFERENCE TO RELATED APPLICATION

This application is based on Japanese Patent Application No. 2013-247471 filed on Nov. 29, 2013, the disclosure of which is incorporated herein by reference.

FIELD OF TECHNOLOGY

The present disclosure relates to an electrical driving device for a vehicle.

BACKGROUND

A brushless motor is known in the art, according to which an electric motor portion and an electrical control portion for controlling the electric motor portion are mechanically coupled to each other and integrally formed in one unit. For example, in an electrical driving device disclosed in Japanese Patent Publication No. 2013-90376, a through-hole is formed in a bottom wall of an electric motor portion and a terminal socket is inserted through the through-hole in order to electrically connect stator coils of the electric motor portion and an electrical control portion.

In the electrical driving device of the above prior art, each of multiple connecting terminals which are held in the terminal socket is made of a flat metal plate and arranged in a straight line. It is, therefore, necessary to form a larger through-hole for the terminal socket. A size of the electrical driving device in a radial direction may become larger.

SUMMARY OF THE DISCLOSURE

The present disclosure is made in view of the above problem. It is an object of the present disclosure to provide an electrical driving device, which can be made smaller in its size.

According to a feature of the present disclosure, the electrical driving device is composed of an electric motor portion, a detection member, a rotational angle sensor, a first semiconductor module, a second semiconductor module, a heat sink, motor wires of a first power control system and motor wires of a second power control system.

The electric motor portion is composed of a stator on which a first winding group of a three-phase winding and a second winding group of the three-phase winding are wound, a rotor rotatable with respect to the stator and a shaft rotatable together with the rotor. The detection member, which is composed of a magnet, is fixed to an axial end of the shaft. The rotational angle sensor is located at a position opposing to the detection member in an axial direction of the shaft and detects change of magnetic field generated by the detection member in order to detect a rotational position of the shaft and the rotor.

The first semiconductor module has switching elements for switching over current supply to each coils of the first winding group. The second semiconductor module has switching elements for switching over current supply to each coils of the second winding group.

The heat sink has a first and a second module holding surfaces to which the first semiconductor module and the second semiconductor module are respectively attached. Each of the module holding surfaces extends in the axial direction of the shaft from an axial end of the heat sink on a side of the detection member.

The motor wires of the first power control system, which are located at radial outward positions of the first semiconductor module, are composed of a first motor wire, a second motor wire and a third motor wire. Each one of the motor wires electrically connects each one of the coils (including a U1 coil, a V1 coil and a W1 coil) of the first winding group to the first semiconductor module.

The motor wires of the second power control system, which are located at radial outward positions of the second semiconductor module, are composed of a fourth motor wire, a fifth motor wire and a sixth motor wire. Each one of the motor wires electrically connects each one of the coils (including a U2 coil, a V2 coil and a W2 coil) of the second winding group to the second semiconductor module.

The motor wires of the first power control system and the motor wires of the second power control system are located on a concentric circle of the detection member (the magnet) and symmetrically arranged to each other with respect to the detection member. When compared with a case in which the motor wires of the first and the second power control systems are arranged in straight lines, it becomes easier in the present embodiment to effectively locate them in a space of the cylindrical shape. As a result, it becomes possible to make the size of the electrical driving device smaller. In addition, it becomes easier to pull out the motor wires from the first and the second winding groups, which are wound on the stator having a circular shape.

In addition, the motor wires of the first power control system and the motor wires of the second power control system are arranged to be symmetrical with respect to the detection member. As a result, it is possible to form the first and the second semiconductor modules in the same shape and thereby it becomes possible to commonly use the parts for the first and the second semiconductor modules.

According to a further feature of the present disclosure, the first motor wire and the third motor wire, which are located at both sides of the second motor wire in a circumferential direction of the electric motor portion, are asymmetrically located to each other with respect to the second motor wire. And the fourth motor wire and the sixth motor wire, which are located at both sides of the fifth motor wire in the circumferential direction of the electric motor portion, are asymmetrically located to each other with respect to the fifth motor wire.

When electronic parts and/or components other than the switching elements, for example, power-source relays, a motor relay or the like are also integrally molded in the first and/or the second semiconductor modules, motor terminals are located in the first and/or second semiconductor modules depending on a layout of those electronic parts and/or components. However, in the present disclosure, it is possible to more flexibly locate the motor wires. Accordingly, it becomes easier to physically and electrically connect the motor wires to the respective motor terminals outwardly extending from the first and/or the second semiconductor modules.

In addition, when the electrical connections between the motor wires and the coils of the first and the second winding groups wound on the stator are suitably selected (that is, suitably changed) depending on phase of current for the first winding group and the second winding group, it becomes possible to reduce detection error by the rotational angle sensor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained hereinafter by way of an embodiment of the present disclosure with reference to the drawings.

Embodiment

An electrical driving device 1 according to the embodiment of the present disclosure will be explained with reference to FIGS. 1 to 7.

Figure 2:
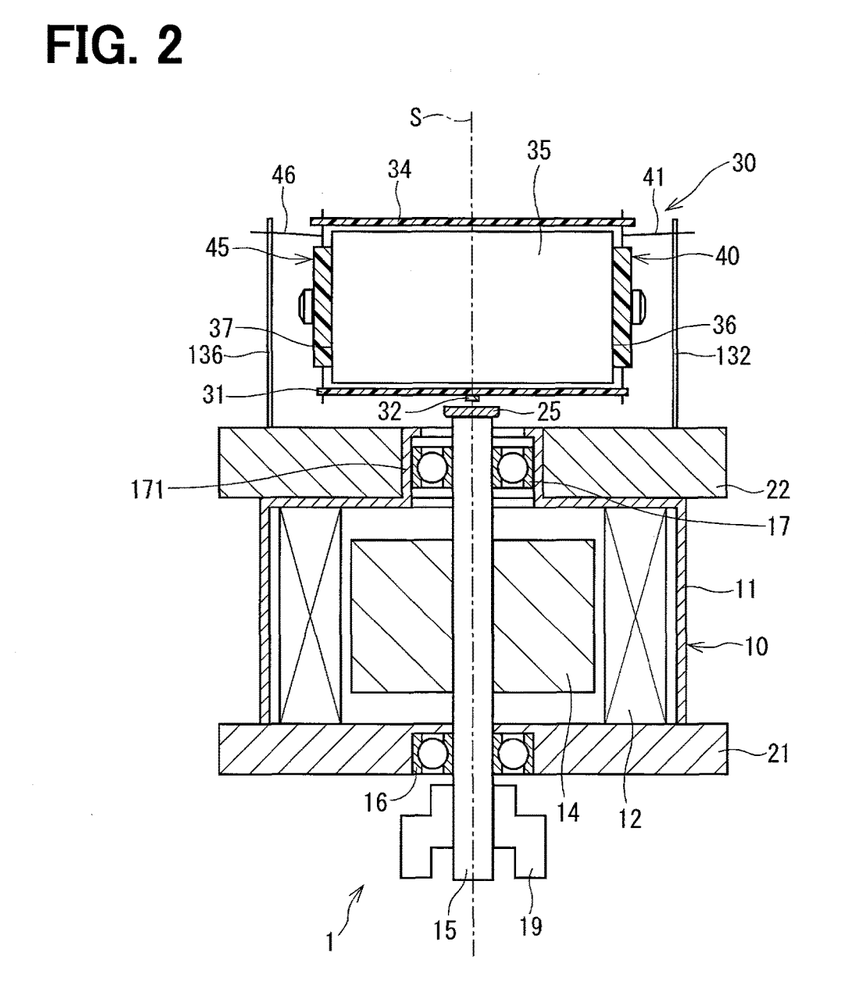
FIG. 2 is a schematic cross sectional view showing the electrical driving device.
Figure 3:
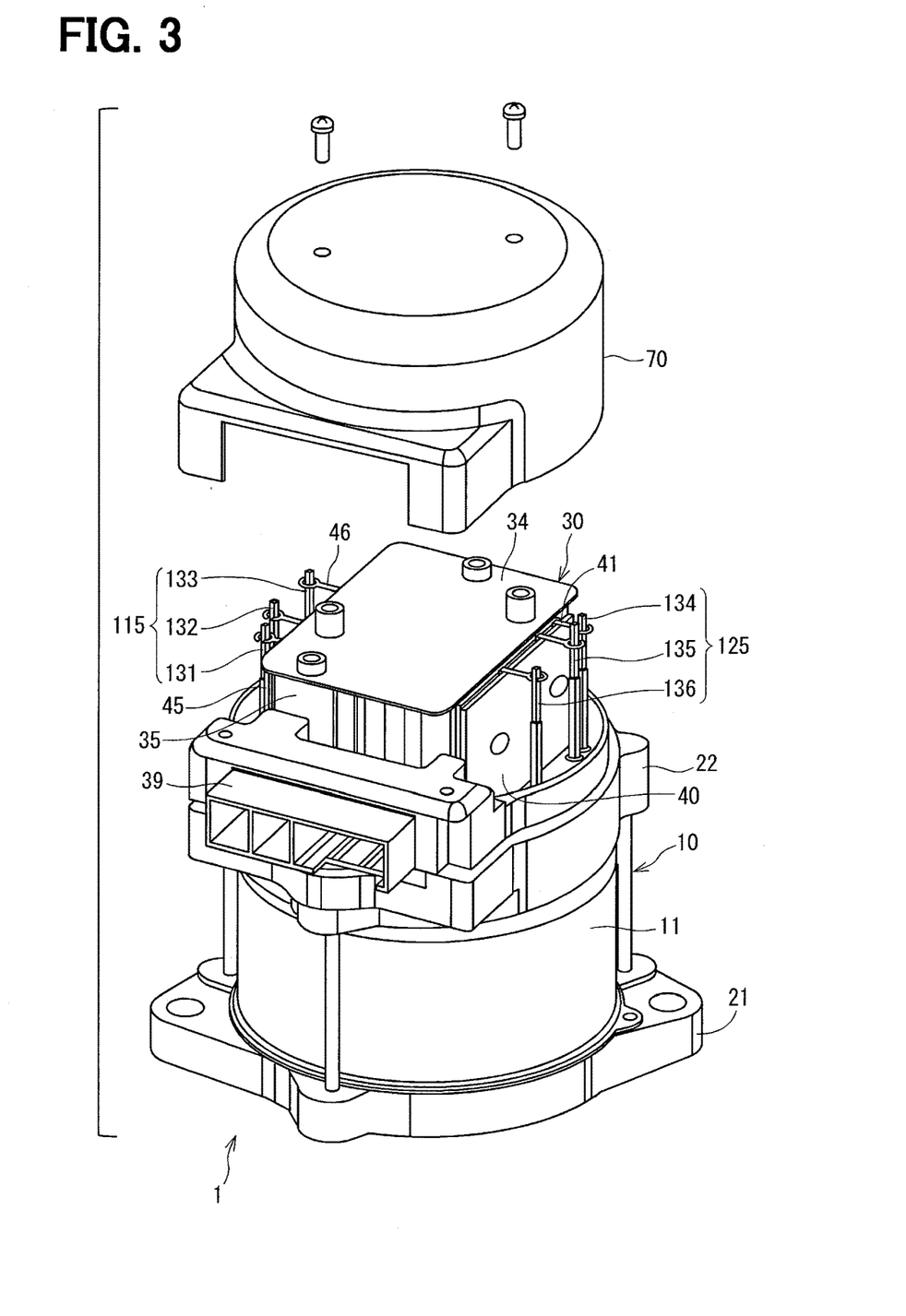
FIG. 3 is a schematic perspective view showing the electrical driving device.

The electrical driving device 1 of the present disclosure is, for example, applied to an electrical power steering apparatus for a vehicle. As shown in FIGS. 2 and 3, the electrical driving device 1 is composed of an electric motor portion 10 and an electrical control portion 30. The electrical control portion 30 is assembled to an axial end of the electric motor portion 10, so that the electric motor portion 10 and the electrical control portion 30 are integrally assembled to each other in one unit to form the electrical driving device 1.

Figure 1:
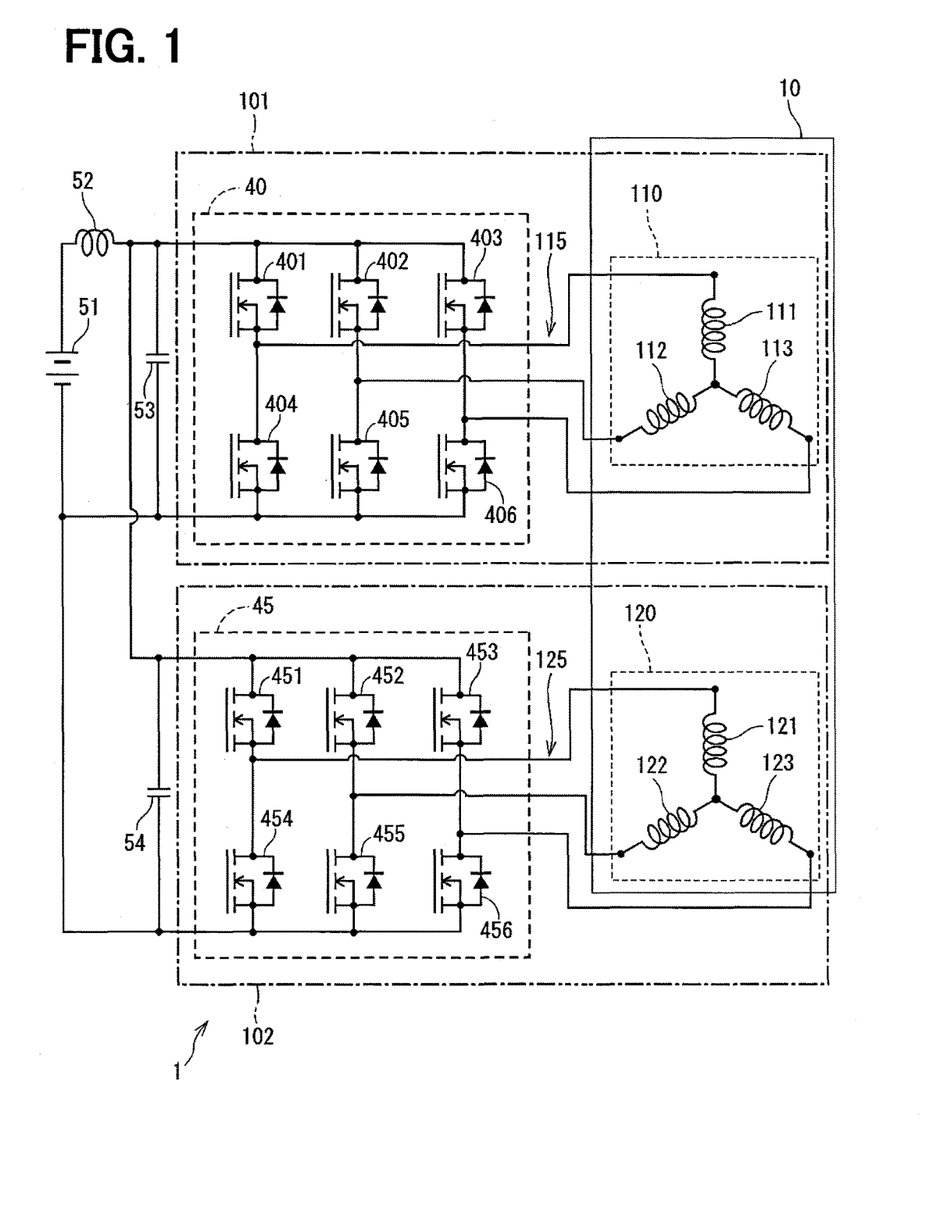
FIG. 1 is a diagram showing an electric circuit incorporated into an electrical driving device according to an embodiment of the present disclosure.

An electric circuit for the electrical driving device 1 will be explained with reference to FIG. 1. In FIG. 1, electrical parts and/or components for the electrical driving device 1, such as power-supply relays, are omitted in FIG. 1.

The electric motor portion 10 is composed of a three-phase brushless electric motor having two winding groups of three-phase windings, that is, a first winding group 110 of the three-phase windings and a second winding group 120 of the three-phase windings. In the present embodiment, a structure for electrical power control to the first winding group 110 is referred to as a first power control system 101, while a structure for electrical power control to the second winding group 120 is referred to as a second power control system 102.

The first winding group 110 is composed of a U1 coil 111, a V1 coil 112 and a W1 coil 113. The second winding group 120 is composed of a U2 coil 121, a V2 coil 122 and a W2 coil 123.

The electrical driving device 1 has a first semiconductor module 40 for the first winding group 110 and a second semiconductor module 45 for the second winding group 120.

The first semiconductor module 40 has six switching elements 401 to 406, which are formed in bridge connections. The first semiconductor module 40 controls on-off operations of the switching elements 401-406 in order to control current supply to the coils 111 to 113 of the first winding group 110. The first semiconductor module 40 is connected to the first winding group 110 via multiple motor wires 115.

The second semiconductor module 45 likewise has six switching elements 451 to 456, which are formed in bridge connections. The second semiconductor module 45 controls on-off operations of the switching elements 451-456 in order to control current supply to the coils 121 to 123 of the second winding group 120. The second semiconductor module 45 is connected to the second winding group 120 via multiple motor wires 125.

A choke coil 52 and capacitors 53 and 54 form a power filter for reducing noises from other electrical devices (not shown) commonly connected to a battery 51 and also reducing noises, which may be transmitted from the first and/or the second power control systems 101 and/or 102 to the other electrical devices.

Figure 4:
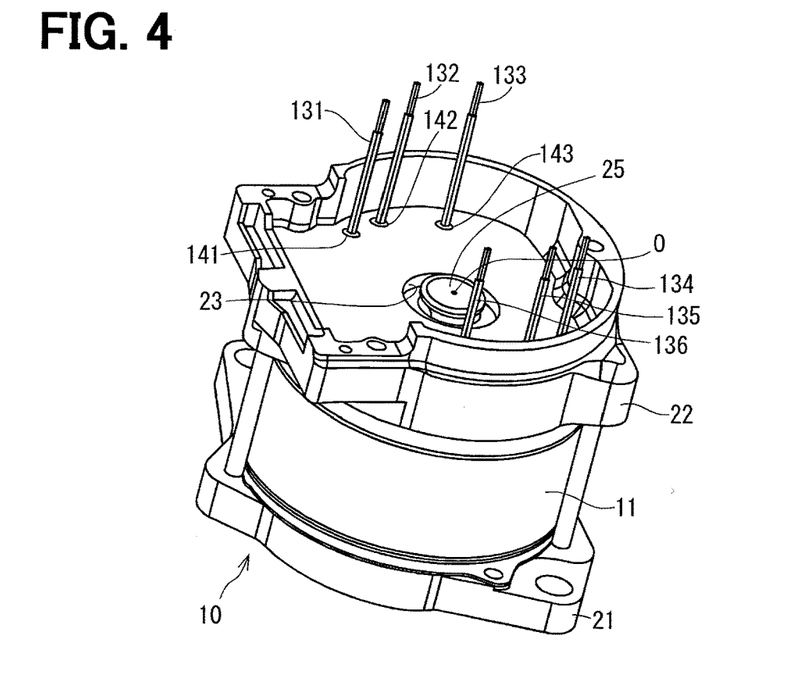
FIG. 4 is a schematic perspective view showing an electric motor portion of the electrical driving device.

A structure of the electrical driving device 1 is schematically shown in FIGS. 2 to 4. FIG. 2 is a cross sectional view taken along a second center line Lc2 in FIG. 5. In FIG. 2, a cover member 70 (FIG. 3) is omitted. In FIG. 4, the electrical control portion 30 is removed in order to show a structure of the electric motor portion 10, in particular, to show the motor wires 131 to 136 (explained below).

As shown in FIGS. 2 to 4, the electric motor portion 10 is composed of a motor casing 11, a stator 12, a rotor 14, a shaft 15, a first frame member 21, a second frame member 22 and so on. The motor casing 11 is made of soft magnetic material, such as, iron, and formed in a cylindrical shape.

The stator 12 has a stator core (not shown) fixed to an inner peripheral surface of the motor casing 11 and each coil 111 to 113 and 121 to 123 of the first and the second winding groups 110 and 120 of the three-phase windings is wound on the stator core.

The rotor 14 is rotatably located in a radial inside space of the stator 12 and coaxially arranged with the stator 12. The rotor 14 is formed in a cylindrical shape, wherein permanent magnets (not shown) are provided on an outer peripheral surface of the rotor 14 so that N-poles and S-poles are alternately formed in a rotating direction of the rotor 14.

The shaft 15 made of metal is fixed to the rotor 14 at its axis center. The shaft 15 is rotatably supported by bearings 16 and 17. The shaft 15 is rotated together with the rotor 14. In the present embodiment, a virtual line extending from an axis center of the shaft 15 is referred to as an axis line "S" of the electric motor portion 10.

The bearings 16 and 17 are ball bearings. The bearing 16 is fixed to the first frame member 21, while the bearing 17 is fixed to a bearing holding portion 171 formed in the motor casing 11 on a side to the electrical control portion 30.

A joint member 19 is provided at an axial end of the shaft 15 on a side opposite to the electrical control portion 30. The joint member 19 is engaged with a gear (not shown) so that rotational force of the rotor 14 and the shaft 15 is outputted to an outside of the electrical driving device 1. A magnet 25 is provided at another axial end of the shaft 15 on a side to the electrical control portion 30. A rotation of the magnet 25 is detected by a rotational angle sensor 32. The magnet 25 is so arranged that a center "O" (FIG. 5) on a surface of the magnet 25 is located on the axis line "S" of the electric motor portion 10. The center "O" on the surface of the magnet 25 is hereinafter simply referred to as the center "O" of the magnet 25. The magnet 25 is also referred to as a detection member, a rotational position of which is detected by the rotational angle sensor 32.

The first frame member 21 is formed almost in a disc shape and covers an axial end of the motor casing 11 on the side opposite to the electrical control portion 30. The bearing 16 is fixed to a center of the first frame member 21.

The second frame member 22 is formed in a shape corresponding to a heat sink 35 and provided at another axial end of the motor casing 11 on the side to the electrical control portion 30. A through-hole 23 is formed at a center of the second frame member 22, so that the axial end of the shaft 15 of an upper side outwardly extends through the through-hole 23 and thereby the magnet 25 is exposed to the outside of the electric motor portion 10 on the side to the electrical control portion 30.

The electrical control portion 30 is composed of a control circuit board 31, a power circuit board 34, the heat sink 35, the first semiconductor module 40, the second semiconductor module 45 and so on. The electrical control portion 30 is fixed to the axial end of the electric motor portion 10 on the side opposite to the joint member 19. The cover member 70 is fixed to an axial end of the electrical control portion 30 on the side opposite to the electric motor portion 10.

The control circuit board 31 is fixed to the heat sink 35 on the side to the electric motor portion 10. Electrical and/or electronic parts and components of a control system, which are relatively small in current-carrying capacity, such as, a micro-computer, a hall IC and so on, are mounted to the control circuit board 31. The rotational angle sensor 32 is mounted to the control circuit board 31 at a position opposing to the magnet 25 in the axial direction so as to detect the rotational angle of the rotor 14 and the shaft 15. The rotational angle sensor 32 is so arranged that a center of the rotational angle sensor 32 is located on the axis line "S" of the electric motor portion 10. In other words, the center of the rotational angle sensor 32 and the center of the magnet 25 coincide with each other, when they are projected in the axial direction of the shaft 15.

The rotational angle sensor 32 is composed of an MR element (a magnetoresistance element). The rotational angle sensor 32 may be composed of a TMR element (a tunnel magnetoresistance element), an AMR element (an anisotropic magnetoresistance element), a GMR element (a giant magnetoresistance element) or the like.

Figure 7:
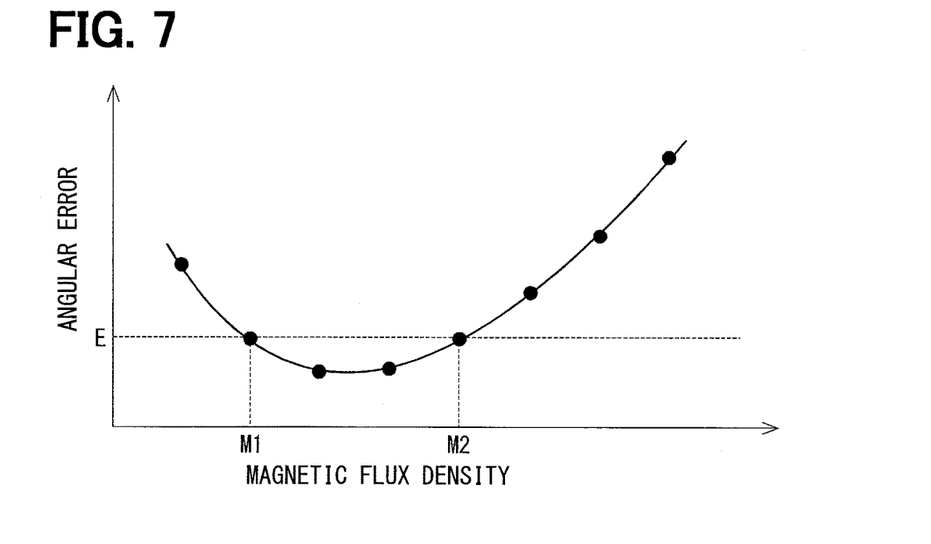
FIG. 7 is a graph for explaining characteristics of a rotational angular sensor.

As shown in FIG. 7, the rotational angle sensor 32 has a characteristic, according to which an angular error varies depending on density of magnetic flux. It is, therefore, preferable to set the density of the magnetic flux of the magnet 25 as well as a distance between the magnet 25 and the rotational angle sensor 32, in such a way that the density of the magnetic flux at the rotational angle sensor 32 falls in a predetermined range between M1 and M2. The density of the magnetic flux M1 and M2 are decided depending on an allowable angular error "E". For example, the density of the magnetic flux at the rotational angle sensor 32 is set at a value between 20 [mT (milli-tesla)] and 50 [mT (milli-tesla)]. Accordingly, it is possible to decrease detection error of the rotational angle sensor 32.

Referring back to FIGS. 2 to 4, the power circuit board 34 is fixed to the heat sink 35 on the side opposite to the electric motor portion 10. Electrical parts and/or components of the power control system, which are relatively large in current-carrying capacity, such as, the choke coil 52, the capacitors 53 and 54 and so on, are mounted to the power circuit board 34.

The heat sink 35, which is made of material having high heat conductivity, such as, aluminum or the like, is fixed to the second frame member 22. The control circuit board 31, the power circuit board 34, the first semiconductor module 40 and the second semiconductor module 45 are fixed to the heat sink 35. A connector 39 is fixed to the second frame member 22 at a radial outward side and at a position between the second frame member 22 and the heat sink 35 in the axial direction. The connector 39 is connected to the battery 51 and other electric devices, such as, a torque sensor.

A pair of (a first and a second) module holding surfaces 36 and 37 is formed in the heat sink 35 for holding the first semiconductor module 40 and the second semiconductor module 45. More exactly, each of the first and the second module holding surfaces 36 and 37 extends from a lower end of the heat sink 35 (an axial end of the heat sink 35 on the side to the electric motor portion 10) in an upward direction (in an axial direction opposite to the electric motor portion 10), so that each of the first and the second module holding surfaces 36 and 37 is perpendicular to an axial end surface of the electric motor portion 10.

The first semiconductor module 40 is fixed to the first module holding surface 36 by fastening means, such as, screws. A heat radiating sheet (not shown) is interposed between the first semiconductor module 40 and the first module holding surface 36. Accordingly, the first semiconductor module 40 is so arranged as to extend in the axial direction of the electric motor portion 10. The switching elements 401 to 406, the power-supply relay (not shown) and other electrical parts are molded together in the first semiconductor module 40 and electrically connected to the control circuit board 31 and the power circuit board 34. Three first motor terminals 41, which are connected to the motor wires 115 of the first power control system 101, extend from an upper side of the first semiconductor module 40, which is opposite to the electric motor portion 10.

In a similar manner, the second semiconductor module 45 is fixed to the second module holding surface 37 by fastening means, such as, screws. A heat radiating sheet (not shown) is interposed between the second semiconductor module 45 and the second module holding surface 37. The second semiconductor module 45 is located at a position opposite to the first semiconductor module 40 in a radial direction. The second semiconductor module 45 is so arranged as to extend in the axial direction of the electric motor portion 10. The switching elements 451 to 456, the power-supply relay (not shown) and other electrical parts are molded together in the second semiconductor module 45 and electrically connected to the control circuit board 31 and the power circuit board 34. Three second motor terminals 46, which are connected to the motor wires 125 of the second power control system 102, extend from an upper side of the second semiconductor module 45, which is opposite to the electric motor portion 10.

In the present embodiment, the first semiconductor module 40 and the second semiconductor module 45 are formed in the same shape.

The motor wires 115 of the first power control system 101 are composed of a first motor wire 131, a second motor wire 132 and a third motor wire 133. Each of the motor wires 131, 132 and 133 is respectively connected to each of the U1 coil 111, the V1 coil 112 and the W1 coil 113.

Each of the motor wires 131 to 133 upwardly extends from the electric motor portion 10, passes through each of wire insert through-holes 141, 142 and 143 formed in the second frame member 22 (FIGS. 4 and 5) and outwardly projects to the side of the electrical control portion 30. Each of the motor wires 131 to 133 is connected to each of the first motor terminals 41, so that each of the coils 111 to 113 of the first winding group 110 is electrically connected to the respective switching elements 401 to 406 of the first semiconductor module 40. Each of the motor wires 131 to 133 may be made of any kinds of electrical parts or elements (for example, flat metal bars), so long as the coils 111 to 113 of the first winding group 110 are electrically connected to the first semiconductor module 40.

In a similar manner, the motor wires 125 of the second power control system 102 are composed of a fourth motor wire 134, a fifth motor wire 135 and a sixth motor wire 136. Each of the motor wires 134, 135 and 136 is respectively connected to each of the U2 coil 121, the V2 coil 122 and the W2 coil 123.

Each of the motor wires 134 to 136 upwardly extends from the electric motor portion 10, passes through each of wire insert through-holes 144, 145 and 146 formed in the second frame member 22 (FIG. 5) and outwardly projects to the side of the electrical control portion 30. Each of the motor wires 134 to 136 is connected to each of the second motor terminals 46, so that each of the coils 121 to 123 of the second winding group 120 is electrically connected to the respective switching elements 451 to 456 of the second semiconductor module 45. Each of the motor wires 134 to 136 may be made of any kinds of electrical parts or elements (for example, the flat metal bars), so long as the coils 121 to 123 of the second winding group 120 are electrically connected to the second semiconductor module 45.

Each of the first to the sixth motor wires 131 to 136 extends in the axial direction of the electric motor portion 10 to a position close to the power circuit board 34. A space is formed between the first to the third motor wires 131 to 133 and the first semiconductor module 40 in the radial direction, so that the first to the third motor wires 131 to 133 may not be brought into contact with the first semiconductor module 40 except for the electrical connections between the first to the third motor wires 131 to 133 and the first motor terminals 41. In a similar manner, a space is formed between the fourth to the sixth motor wires 134 to 136 and the second semiconductor module 45, so that the fourth to the sixth motor wires 134 to 136 may not be brought into contact with the second semiconductor module 45 except for the electrical connections between the fourth to the sixth motor wires 134 to 136 and the second motor terminals 46.

Figure 5:
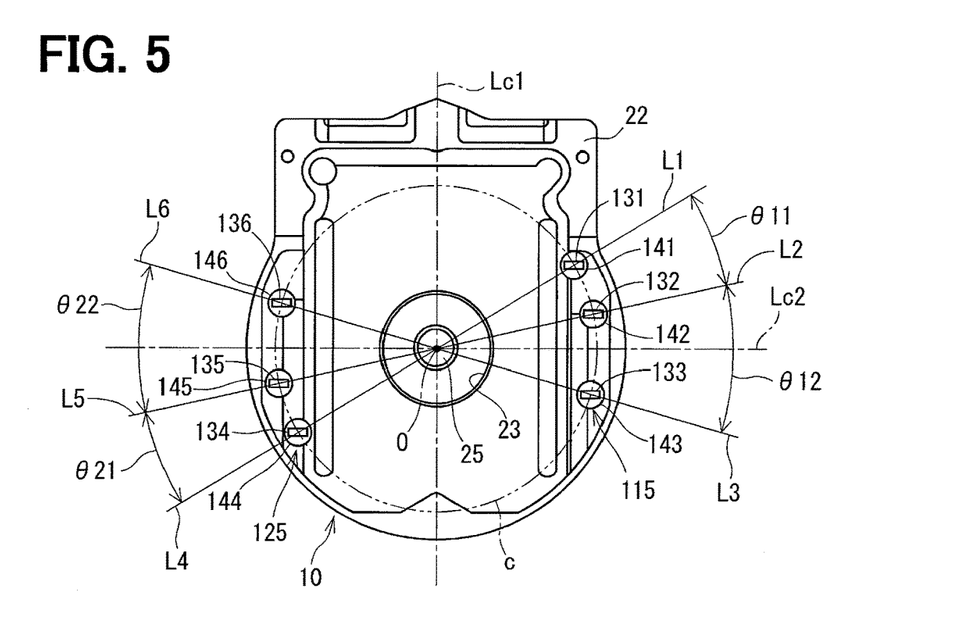
FIG. 5 is a schematic top plan view showing locations of motor wires.
Figure 6:
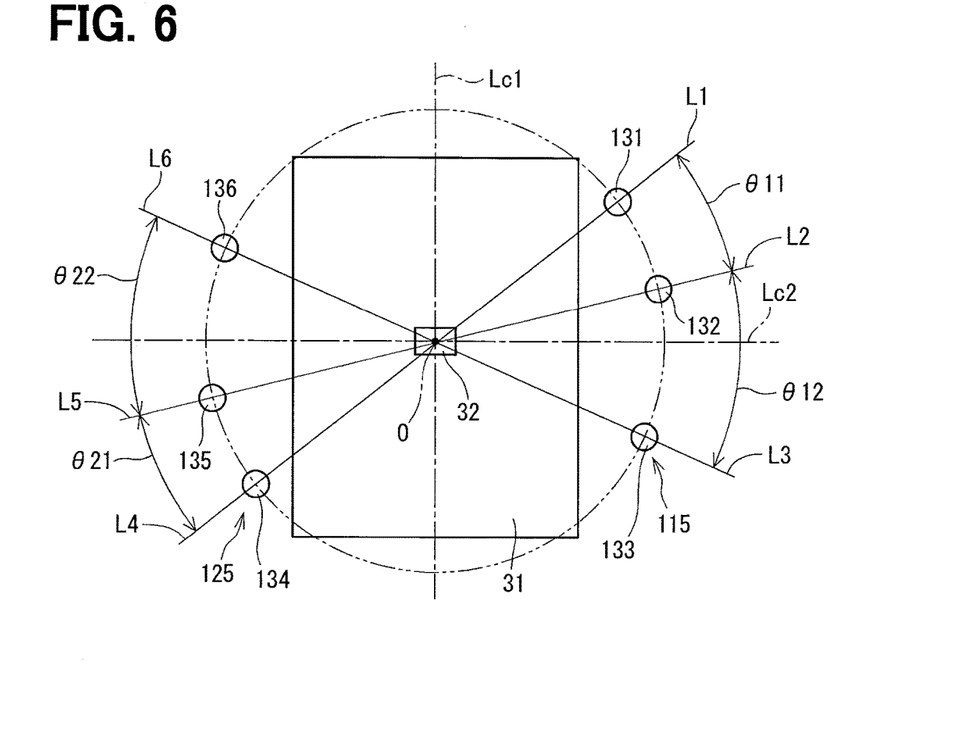
FIG. 6 is a schematic view showing locations of the motor wires.

Locations of the motor wires 131 to 136 will be explained with reference to FIGS. 5 and 6. FIG. 5 is a view showing the electric motor portion 10 when viewed from the electrical control portion 30. A front side of the drawing of FIG. 5 corresponds to a side of the connector 39. FIG. 6 schematically shows the locations of the rotational angle sensor 32 mounted to the control circuit board 31 and the motor wires 131 to 136. In the following explanation, unless otherwise referred to, "the locations of the motor wires" mean "locations on a virtual plane perpendicular to the axis line "S" of the electric motor portion 10", which is equal to an upper-side surface of the magnet 25.

In the present embodiment, a center line, which passes over the center "O" of the magnet 25 and divides the heat sink 35 and the connector 39 into two parts (a right-hand side and a left-hand side) in a symmetric manner, is referred to a first center line Lc1. A perpendicular line of the first center line Lc1, which also passes over the center "O" of the magnet 25, corresponds to the second center line Lc2. The second center line Lc2 corresponds to a straight line perpendicular to each of the first and the second module holding surfaces 36 and 37.

The first to the third motor wires 131 to 133 of the first power control system 101 are located on the right-hand side of the first center line Lc1 (in FIG. 5 or 6) and at such positions which are radial outward positions of the first semiconductor module 40. In addition, the second motor wire 132 is located at a position on an upper-side of the second center line Lc2 (in FIG. 5 or 6), that is, a side closer to the connector 39. In other words, the second motor wire 132 is located at a position displaced from the second center line Lc2.

The fourth to the sixth motor wires 134 to 136 of the second power control system 102 are located on the left-hand side of the first center line Lc1 (in FIG. 5 or 6) and at such positions which are radial outward positions of the second semiconductor module 45. In addition, the fifth motor wire 135 is located at a position on a lower-side of the second center line Lc2 (in FIG. 5 or 6), that is, a side opposite to the connector 39. In other words, the fifth motor wire 135 is located at a position displaced from the second center line Lc2.

The motor wires 115 (including the motor wires 131 to 133) of the first power control system 101 and the motor wires 125 (including the motor wires 134 to 136) of the second power control system 102 are arranged to be symmetrical with respect to the center "O" of the magnet 25. Therefore, it is possible to form the first and the second semiconductor modules 40 and 45 in the same shape to each other and to commonalize the parts thereof.

In addition, the motor wires 131 to 136 are arranged in a concentric fashion to the center "O" of the magnet 25. Namely, each of the motor wires 131 to 136 is located on a concentric circle "C" having a center coinciding with the center "O" of the magnet 25. As a result, it is possible to easily pull out the motor wires 131 to 136 from the first and the second winding groups 110 and 120, which are wound on the stator 12 of a cylindrical shape. Therefore, the above locations of the motor wires 131 to 136 are advantageous in view of a simple manufacturing process.

In the present embodiment, the first motor wire 131 and the third motor wire 133, which are located at both sides of the second motor wire 132 in a circumferential direction of the electric motor portion 10, are located in an asymmetric manner with respect to the second motor wire 132. More in detail, an angle "θ11" formed between straight lines L1 and L2 is different from an angle "θ12" formed between straight lines L2 and L3. The straight line L1 is a radial line extending from the center "O" of the magnet 25 to the first motor wire 131, the straight line L2 is a radial line extending from the center "O" of the magnet 25 to the second motor wire 132, and the straight line L3 is a radial line extending from the center "O" of the magnet 25 to the third motor wire 133. In the present embodiment, the angle "θ11" is smaller than the angle "θ12" (that is, θ11<θ12).

In a similar manner, the fourth motor wire 134 and the sixth motor wire 136, which are located at both sides of the fifth motor wire 135 in the circumferential direction of the electric motor portion 10, are located in an asymmetric manner with respect to the fifth motor wire 135. More in detail, an angle "θ21" formed between straight lines L4 and L5 is different from an angle "θ22" formed between straight lines L5 and L6. The straight line L4 is a radial line extending from the center "O" of the magnet 25 to the fourth motor wire 134, the straight line L5 is a radial line extending from the center "O" of the magnet 25 to the fifth motor wire 135, and the straight line L6 is a radial line extending from the center "O" of the magnet 25 to the sixth motor wire 136. In the present embodiment, the angle "θ21" is smaller than the angle "θ22" (that is, θ21<θ22).

Since the motor wires 131 to 133 and the motor wires 134 to 136 are symmetric with respect to the center "O" of the magnet 25, the angle "θ11" is equal to the angle "θ21" (that is, θ11=θ21) and the angle "θ12" is equal to the angle "θ22" (that is, θ12=θ22). Each of an angle "θ31" formed between the straight lines L1 and L4, an angle "θ32" formed between the straight lines L2 and L5, and an angle "θ33" formed between the straight lines L3 and L6 is 180 degrees. In the drawings, the angles "θ31", "θ32" and "θ33" are not shown for the purpose of simplicity. The first motor wire 131 and the fourth motor wire 134, which are symmetrically arranged with respect to the center "O" of the magnet 25, form a first motor-wire pair. In a similar manner, the second motor wire 132 and the fifth motor wire 135 form a second motor-wire pair, and the third motor wire 133 and the sixth motor wire 136 form a third motor-wire pair.

One of the motor wires 131, 132 and 133 is connected to the U1 coil 111, another one of the motor wires 131, 132 and 133 is connected to the V1 coil 112, and the remaining motor wire 131, 132 or 133 is connected to the W1 coil 113. There are six combinations for the electrical connections between the motor wires 131 to 133 and the coils 111 to 113 of the first winding group 110 (the electrical connections are also referred to phase locations of the motor wires).

In a similar manner, one of the motor wires 134, 135 and 136 is connected to the U2 coil 121, another one of the motor wires 134, 135 and 136 is connected to the V2 coil 122, and the remaining motor wire 134, 135 or 136 is connected to the W2 coil 123. There are six combinations for the electrical connections between the motor wires 134 to 136 and the coils 121 to 123 of the second winding group 120 (six different phase locations of the motor wires).

Accordingly, there are thirty-six combinations of the phase locations for the motor wires 115 of the first power control system 101 and the phase locations for the motor wires 125 of the second power control system 102.

In the present embodiment, the rotational angle sensor 32 detects the change of magnetic field of the magnet 25, which is rotated together with the shaft 15, in order to detect the rotational position of the shaft 15 and the rotor 14. In the present embodiment, the motor wires 131 to 136 are located at radial outward positions of the magnet 25 and the rotational angle sensor 32. Therefore, when electric current flows through the motor wires 131 to 136, the magnetic field generated by the magnet 25 and detected by the rotational angle sensor 32 may be adversely affected by magnetic field generated by the current flow through the motor wires 131 to 136.

Therefore, in the present embodiment, the phase locations of the motor wires are so arranged that adverse influence to the rotational angle sensor 32 caused by leakage of magnetic flux from the motor wires 131 to 136 can be made as smaller as possible.

In a case that there is no phase difference between first current I-1 flowing through the first power control system 101 and second current I-2 flowing through the second power control system 102, the motor wires and the coils are electrically connected to each other, for example, in the following manners; the first motor wire 131 and the U1 coil 111; the second motor wire 132 and the V1 coil 112; the third motor wire 133 and the W1 coil 113; the fourth motor wire 134 and the U2 coil 121; the fifth motor wire 135 and the V2 coil 122; and the sixth motor wire 136 and the W2 coil 123.

Therefore, the electric current for the first motor wire 131 and the electric current for the fourth motor wire 134 are in the same phase to each other, wherein the first motor wire 131 and the fourth motor wire 134 are located on the opposite sides across the magnet 25 to form the first motor-wire pair. In the same manner, the electric current for the second motor wire 132 and the electric current for the fifth motor wire 135 are in the same phase to each other, wherein the second motor wire 132 and the fifth motor wire 135 are located on the opposite sides across the magnet 25 to form the second motor-wire pair. The electric current for the third motor wire 133 and the electric current for the sixth motor wire 136 are likewise in the same phase to each other, wherein the third motor wire 133 and the sixth motor wire 136 are located on the opposite sides across the magnet 25 to form the third motor-wire pair. As above, the phase locations for the motor wires 115 (131 to 133) of the first power control system 101 and the phase locations for the motor wires 125 (134 to 136) of the second power control system 102 are arranged to be symmetrical with respect to the magnet 25.

In the case that there exists no phase difference between the first current I-1 and the second current I-2, magnetic field to be generated by the current supply to the motor wires 115 of the first power control system 101 and magnetic field to be generated by the current supply to the motor wires 125 of the second power control system 102 are almost equal to each other. The adverse influence caused by the leakage of the magnetic flux is cancelled between the motor wires 115 and the motor wires 125, because the phase locations of the motor wires 115 and the phase locations of the motor wires 125 are arranged to be symmetrical with respect to the magnet 25. As a result, it is possible to reduce the detection error by the rotational angle sensor 32.

In a case that there is a phase difference between the first current I-1 and the second current I-2, the motor wires and the coils are electrically connected to each other, for example, in the following manners; the first motor wire 131 and the V1 coil 112; the second motor wire 132 and the U1 coil 111; the third motor wire 133 and the W1 coil 113; the fourth motor wire 134 and the U2 coil 121; the fifth motor wire 135 and the W2 coil 123; and the sixth motor wire 136 and the V2 coil 122.

As a result, the electric current for the first motor wire 131 and the electric current for the fourth motor wire 134 are in the different phase to each other, wherein the first motor wire 131 and the fourth motor wire 134 belong to the same first motor-wire pair. The electric current for the second motor wire 132 and the electric current for the fifth motor wire 135 are also in the different phase to each other, wherein the second motor wire 132 and the fifth motor wire 135 belong to the same second motor-wire pair. In addition, the electric current for the third motor wire 133 and the electric current for the sixth motor wire 136 are in the different phase to each other, wherein the third motor wire 133 and the sixth motor wire 136 belong to the same third motor-wire pair. As above, the phase locations for the motor wires 115 (131 to 133) of the first power control system 101 and the phase locations for the motor wires 125 (134 to 136) of the second power control system 102 are arranged to be asymmetrical with respect to the magnet 25. In other words, the phase locations in each motor-wire pair are different from each other.

In the case that there exists the phase difference between the first current I-1 and the second current I-2, for example, when the phase of the second current I-2 is delayed from the phase of the first current I-1 by an electrical angle of 30 degrees, the magnetic field to be generated by the current supply to the motor wires 115 of the first power control system 101 and the magnetic field to be generated by the current supply to the motor wires 125 of the second power control system 102 are different from each other. Namely, the magnetic fields are respectively generated in each motor-wire pair at different timings. Therefore, the detection error by the rotational angle sensor 32 becomes smaller, when the phase locations of the motor wires 115 and the phase locations of the motor wires 125 are arranged to be asymmetrical with respect to the magnet 25.

According to the present embodiment, it is possible to more effectively cancel the influences caused by the leakage of the magnetic flux in the motor wires 115 of the first power control system 101, when the center motor wire (that is, the second motor wire 132) is located closer to the neighboring motor wires (that is, the first and the third motor wires 131 and 133). It is, therefore, preferable that each of the angle "θ11" and the angle "θ12" is set at a value smaller than 30 degrees. Each of the angles "θ11" and "θ12" is larger than zero degree, so that the second motor wire 132 is not in contact with the first and the third motor wires 131 and 133. The same thing is applied to the angles "θ21" and "θ22" for the motor wires 125 of the second power control system 102. According to the above structure, even when one of the power control systems 101 and 102 becomes out of order, the electric motor portion 10 is operated by the other power control system 101 or 102 and the detection error by the rotational angle sensor 32 can be reduced.

As explained above, the electrical driving device 1 is composed of the electric motor portion 10, the magnet 25 (the detection member), the rotational angle sensor 32, the first semiconductor module 40, the second semiconductor module 45, the heat sink 35, the motor wires 115 of the first power control system 101, the motor wires 125 of the second power control system 102 and so on.

The electric motor portion 10 is composed of the stator 12, on which the coils 111 to 113 of the first winding group 110 and the coils 121 to 123 of the second winding group 120 of the three-phase windings are wound, the rotor 14 rotatable with respect to the stator 12, and the shaft 15 rotatable together with the rotor 14.

The magnet 25 (the detection member) is provided at one of the axial ends of the shaft 15.

The rotational angle sensor 32 is provided at the position opposing to the magnet 25 in the axial direction of the shaft 15 in order to detect the change of the magnetic field of the magnet 25, to thereby detect the rotational position of the shaft 15 and the rotor 14.

The first semiconductor module 40 has the switching elements 401 to 406 for switching over the current supply to the respective coils 111 to 113 of the first winding group 110.

The second semiconductor module 45 has the switching elements 451 to 456 for switching over the current supply to the respective coils 121 to 123 of the second winding group 120.

The heat sink 35 has the first and the second module holding surfaces 36 and 37, to which the first and the second semiconductor modules 40 and 45 are respectively fixed. Each of the first and the second module holding surfaces 36 and 37 axially extends from one axial end of the heat sink 35 on the side closer to the magnet 25 attached to the shaft 15 of the electric motor portion 10.

The motor wires 115 of the first power control system 101 are composed of the first motor wire 131, the second motor wire 132 and the third motor wire 133, which are located at the radial outward positions of the first semiconductor module 40. The first to the third motor wires 131 to 133 are respectively connected to each one of the U1 coil 111, the V1 coil 112 and the W1 coil 113 of the first winding group 110, so that the coils 111 to 113 are electrically connected to the first semiconductor module 40.

In the similar manner, the motor wires 125 of the second power control system 102 are composed of the fourth motor wire 134, the fifth motor wire 135 and the sixth motor wire 136, which are located at the radial outward positions of the second semiconductor module 45. The fourth to the sixth motor wires 134 to 136 are respectively connected to each one of the U2 coil 121, the V2 coil 122 and the W2 coil 123 of the second winding group 120, so that the coils 121 to 123 are electrically connected to the second semiconductor module 45.

The motor wires 131 to 133 (the motor wires 115 of the first power control system 101) and the motor wires 134 to 136 (the motor wires 125 of the second power control system 102) are located on the concentric circle "C" and arranged to be symmetrical with respect to the magnet 25.

In the motor wires 115 of the first power control system 101, the first motor wire 131 and the third motor wire 133 are located at both sides of the second motor wire 132 in the circumferential direction, wherein the first and the third motor wires 131 and 133 are arranged to be asymmetrical with respect to the second motor wire 132.

In the similar manner, in the motor wires 125 of the second power control system 102, the fourth motor wire 134 and the sixth motor wire 136 are located at both sides of the fifth motor wire 135 in the circumferential direction, wherein the fourth and the sixth motor wires 134 and 136 are arranged to be asymmetrical with respect to the fifth motor wire 135.

In the present embodiment, as explained above, the motor wires 131 to 133 of the first power control system 101 and the motor wires 134 to 136 of the second power control system 102 are located on the concentric circle "C" having the center, which coincides with the center of the magnet 25. When compared with a case in which the motor wires of the first and the second power control systems are arranged in the straight lines, it becomes easier in the present embodiment to effectively locate them in the space of the cylindrical shape. As a result, it becomes possible to make the size of the electrical driving device 1 smaller. In addition, it becomes easier to pull out the motor wires 115 and 125 from the first and the second winding groups 110 and 120, which are wound on the stator 12 having the circular shape.

In addition, as explained above, the motor wires 131 to 133 (the motor wires 115 of the first power control system 101) and the motor wires 134 to 136 (the motor wires 125 of the second power control system 102) are arranged to be symmetrical with respect to the magnet 25. Accordingly, "θ11"="θ21", "θ12"="θ22", and "θ31"="θ32"="θ33"=180 degrees. As a result, it is possible to form the first and the second semiconductor modules 40 and 45 in the same shape and thereby it becomes possible to commonly use the parts for the first and the second semiconductor modules 40 and 45.

Furthermore, the first motor wire 131 and the third motor wire 133 are arranged to be asymmetrical with respect to the second motor wire 132. Therefore, "θ11"≠"θ12". The second motor wire 132 is located at the position displaced from the second center line Lc2, which passes through the center of the first module holding surface 36 and which is perpendicular to the first module holding surface 36.

The electronic parts and/or components other than the switching elements 401 to 406, for example, the power-source relays, the motor relay and the like, are also integrally molded in the first semiconductor module 40. The first motor terminals 41 are located in the first semiconductor module 40 depending on the layout of those electronic parts and/or components. However, as explained above, since it is not always necessary to arrange the first to the third motor wires 131 to 133 in the symmetric manner, it is possible to more flexibly locate the motor wires. Accordingly, it becomes easier to physically and electrically connect the motor wires 131 to 133 to the respective first motor terminals 41 outwardly extending from the first semiconductor module 40.

In the similar manner, the fourth motor wire 134 and the sixth motor wire 136 are arranged to be asymmetrical with respect to the fifth motor wire 135. Therefore, "θ21"≠"θ22". The fifth motor wire 135 is located at the position displaced from the second center line Lc2, which passes through the center of the second module holding surface 37 and which is perpendicular to the second module holding surface 37.

The electronic parts and/or components other than the switching elements 451 to 456, for example, the power-source relays, the motor relay and the like, are also integrally molded in the second semiconductor module 45. The second motor terminals 46 are located in the second semiconductor module 40 depending on the layout of those electronic parts and/or components. However, as explained above, since it is not always necessary to arrange the fourth to the sixth motor wires 134 to 136 in the symmetric manner, it is possible to more flexibly locate the motor wires. Accordingly, it becomes easier to physically and electrically connect the motor wires 134 to 136 to the respective second motor terminals 46 outwardly extending from the second semiconductor module 45.

In the present embodiment, since the motor wires 131 to 136 are arranged at the radial outward positions of the magnet 25 and the rotational angle sensor 32, the detection error may be generated in the rotational angle sensor 32 by the influence of the leakage of the magnetic flux when the electric power is supplied to the motor wires 131 to 136.

In the present embodiment, however, the phase locations for the motor wires 131 to 136 are decided depending on the phase of the current, so that the detection error of the rotational angle sensor 32 can be made smaller.

More exactly, when the phase of current for the first winding group 110 is in the same phase to that for the second winding group 120, the first motor wire 131 and the fourth motor wire 134 of the first motor-wire pair, which are symmetrically arranged with respect to the magnet 25, are respectively connected to each of the coils (for example, the U1 coil 111 and the U2 coil 121) of the first and the second winding groups 110 and 120, in such a way that the electric current of the same phase is supplied to the motor wires 131 and 134 belonging to the same motor-wire pair. In the same manner, the second motor wire 132 and the fifth motor wire 135 are respectively connected to each of the coils (for example, the V1 coil 112 and the V2 coil 122) of the first and the second winding groups 110 and 120, in such a way that the electric current of the same phase is supplied to the motor wires 132 and 135 belonging to the same motor-wire pair. And the third motor wire 133 and the sixth motor wire 136 are respectively connected to each of the coils (for example, the W1 coil 113 and the W2 coil 123) of the first and the second winding groups 110 and 120, in such a way that the electric current of the same phase is supplied to the motor wires 133 and 136 belonging to the same motor-wire pair. As above, the phase locations of the motor wires 115 of the first power control system 101 and the phase locations of the motor wires 125 of the second power control system 102 are symmetrically arranged with respect to the magnet 25.

According to the above structure, the magnetic field generated by the current supply to the motor wires 115 of the first power control system 101 and the magnetic field generated by the current supply to the motor wires 125 of the second power control system 102 are cancelled by each other. It is, therefore, possible to make the detection error by the rotational angle sensor 32 smaller.

On the contrary, when the phase of current for the first winding group 110 is different from that for the second winding group 120, at least in two motor-wire pairs of the first motor-wire pair to the third motor-wire pair (the first motor wire 131 and the fourth motor wire 134, the second motor wire 132 and the fifth motor wire 135, and the third motor wire 133 and the sixth motor wire 136), the electrical connections between the motor wires and the coils are changed in the following manner. Each of the motor wires 115 of the first power control system 101 is connected to one of the coils of the first winding group 110 and one of the motor wires 125 of the second power control system 102 (belonging to the same motor-wire pair) is connected to one of the coils of the second winding group 120, so that the electric current of the different phase is supplied to the respective coils of the first and the second winding groups 110 and 120. In other words, the phase locations of the motor wires 115 of the first power control system 101 and the phase locations of the motor wires 125 of the second power control system 102 are asymmetrically arranged with respect to the magnet 25.

For example, the first motor wire 131 is connected to the V1 coil 112, the second motor wire 132 is connected to the U1 coil 111 and the third motor wire 133 is connected to the W1 coil 113. On the other hand, the fourth motor wire 134 is connected to the U2 coil 121, the fifth motor wire 135 is connected to the W2 coil 123 and the sixth motor wire 136 is connected to the V2 coil 122. In the above example, the first to the third motor wires 131 to 133 and the fourth to the sixth motor wires 134 to 136 are respectively arranged in the symmetric manner with respect to the magnet 25. The first to the third motor wires 131 to 133 are connected to the coils of the first winding group 110 and the fourth to the sixth motor wires 134 to 136 are connected to the coils of the second winding group 120, in such a way that the phase of current for each of the first to the third motor wires 131 to 133 is different from the phase of current for each of the fourth to the sixth motor wires 134 to 136.

According to the above structure, even when the electric currents of the different phase are supplied to the first and the second winding groups 110 and 120, the detection error by the rotational angle sensor 32 can be made smaller.

The rotational angle sensor 32 is made of the MR element and the density of the magnetic flux is set at the value between 20 [mT] and 50 [mT]. According to the above features it is possible to decrease the detection error by the rotational angle sensor 32.

Other Embodiments and/or Modifications

In the above embodiment, the rotational angle sensor 32 is composed of the MR element. The present disclosure may be applied to any other types of sensors for detecting magnetic flux, for example, a resolver, a hall element and so on. In the above embodiment, the detection member, the rotational position of which is detected, is composed of the magnet 25. Any other kinds of members may be used for the detection member, the rotational position of which is detected by the rotational angle sensor, so long as the rotational position of the shaft and the rotor can be detected by the rotational angle sensor.

In the above embodiment, the first semiconductor module 40 and the second semiconductor module 45 are formed in the same shape to each other. However, the first and the second semiconductor modules may be formed in a different shape from each other.

In the above embodiment, the switching elements, which form one inverter, are assembled in one module. However, the switching elements forming one inverter may be formed by multiple modules. Namely, each of the first and the second semiconductor modules 40 and 45 may be formed by multiple modules.

In the above embodiment, in each of the motor-wire pairs, that is, the first motor wire 131 and the fourth motor wire 134, the second motor wire 132 and the fifth motor wire 135, and the third motor wire 133 and the sixth motor wire 136, the motor wire (131, 132 or 133) of the first power control system 101 and the motor wire (134, 135 or 136) of the second power control system 102 are symmetrically arranged with respect to the magnet 25 (that is, the detection member, the rotational position of which is detected). And when the current for the first winding group 110 and the current for the second winding group 120 are in the same phase of current to each other, the motor wire of the of the first power control system 101 (for example, the first motor wire 131) is connected to the coil of the first winding group 110 (for example, the U1 coil 111), while the motor wire of the second power control system 102 in the same motor-wire pair (that is, the fourth motor wire 134) is connected to the coil of the second winding group 120 (that is, the U2 coil 121), in order that the current of the same phase flows through those coils (the U1 coil 111 and the U2 coil 121).

In the same manner, each of the other two motor wires of the of the first power control system 101 (the second and the third motor wires 132 and 133) is connected to each of the other two coils of the first winding group 110 (the V1 coil 112 and the W1 coil 113), while each of the other two motor wires of the second power control system 102 in the same motor-wire pair (the fifth and the sixth motor wires 135 and 136) is connected to each of the other two coils of the second winding group 120 (the V2 coil 122 and the W2 coil 123), in order that the current of the same phase flows through those coils (the V1 coil 112 and the V2 coil 122, and the W1 coil 113 and the W2 coil 123).

However, the electrical connections between the motors wires and the coils of the winding groups may be modified in the following manner, when the current for the first winding group 110 and the current for the second winding group 120 are in the different phase of current from each other:

For example, the first motor wire 131 may be connected to any one of the coils of the first winding group 110 and the fourth motor wire 134 of the same motor-wire pair may be connected to any one of the coils of the second winding group 120, so long as the current of the same phase flows through each of those coils of the first and the second winding groups 110 and 120. In the same manner, the second motor wire 132 and the fifth motor wire 135 may be respectively connected to any one of the coils of the first winding group 110 and to any one of the coils of the second winding group 120, so long as the current of the same phase flows through each of those coils of the first and the second winding groups 110 and 120. In addition, the third motor wire 133 and the sixth motor wire 136 may be respectively connected to any one of the coils of the first winding group 110 and to any one of the coils of the second winding group 120, so long as the current of the same phase flows through each of those coils of the first and the second winding groups 110 and 120.

When, in the above embodiment, the current for the first winding group 110 and the current for the second winding group 120 are in the different phase from each other, the first motor wire 131 is connected to the V1 coil 112 of the first winding group 110, while the fourth motor wire 134 of the same motor-wire pair is connected to the U2 coil 121 of the second winding group 120, in order that the current of the different phase flows through each of those coils 112 and 121 of the first and the second winding groups 110 and 120. In the same manner, the second motor wire 132 is connected to the U1 coil 111 of the first winding group 110, while the fifth motor wire 135 of the same motor-wire pair is connected to the W2 coil 123 of the second winding group 120, in order that the current of the different phase flows through each of those coils 111 and 123 of the first and the second winding groups 110 and 120. In addition, the third motor wire 133 is connected to the W1 coil 113 of the first winding group 110, while the sixth motor wire 136 of the same motor-wire pair is connected to the V2 coil 122 of the second winding group 120, in order that the current of the different phase flows through each of those coils 113 and 122 of the first and the second winding groups 110 and 120. As above, in each of the motor-wire pairs, the motor wire of the first power control system 101 is connected to the coil of the first winding group 110 and the motor wire of the second power control system 102 is connected to the coil of the second winding group 120, in order that the current of the different phase flows through the respective coils of the first and the second winding groups 110 and 120.

The electrical connections between the motor wires and the coils should not be limited to the above embodiment. Any other electrical connections can be possible.

For example, the electrical connections may be modified in such a way that, not in all of the motor-wire pairs but at least in each of two motor-wire pairs, the motor wire of the first power control system 101 may be connected to the coil of the first winding group 110 and the motor wire of the second power control system 102 may be connected to the coil of the second winding group 120, in order that the current of the different phase flows through the respective coils of the first and the second winding groups 110 and 120. And in the remaining motor-wire pair, the motor wire of the first power control system 101 may be connected to the coil of the first winding group 110 and the motor wire of the second power control system 102 may be connected to the coil of the second winding group 120, in order that the current of the same phase flows through the respective coils of the first and the second winding groups 110 and 120.

In addition, the electrical connections may be modified in such a way that, in each of the motor-wire pairs, the motor wire of the first power control system 101 is connected to the coil of the first winding group 110 and the motor wire of the second power control system 102 is connected to the coil of the second winding group 120, in order that the current of the different phase flows through the respective coils of the first and the second winding groups 110 and 120, even in the case that the current for the first winding group 110 and the current for the second winding group 120 are in the same phase of current to each other.

In the above embodiment, the second motor wire 132, which is arranged between the first and the third motor wires 131 and 133 of the first power control system 101, is located at the position displaced from the second center line Lc2 extending from the first module holding surface 36 in the direction perpendicular thereto. In the similar manner, the fifth motor wire 135, which is arranged between the fourth and the sixth motor wires 134 and 136 of the second power control system 102, is located at the position displaced from the second center line Lc2 extending from the second module holding surface 37 in the direction perpendicular thereto.

However, it may be so modified that each of the second and the fifth motor wires 132 and 135 is located at a position on the second center line Lc2 extending from the module holding surfaces 36 and 37 in the direction perpendicular thereto.

In the above embodiment, the electrical driving device 1 is applied to the electrical power steering apparatus of the vehicle. However, the electrical driving device 1 may be applied to any other devices than the electrical power steering apparatus.

The present disclosure should not be limited to the above embodiments and/or modifications but can be further modified in various manners without departing from the spirit of the present disclosure.

What is claimed is:

1. An electrical driving device comprising:
an electric motor portion having a stator on which a first winding group of a three-phase winding and a second winding group of the three-phase winding are wound, a rotor rotatably arranged with respect to the stator, and a shaft rotatable together with the rotor, wherein the first winding group is composed of a U1 coil, a V1 coil and a W1 coil, and the second winding group is composed of a U2 coil, a V2 coil and a W2 coil;
a detection member provided at one of axial ends of the shaft;
a rotational angle sensor provided at a position opposing to the detection member in an axial direction of the shaft and for detecting a rotational position of the shaft and the rotor by detecting a change of magnetic field generated by the detection member;
a first semiconductor module having switching elements for switching over current supply to the coils of the first winding group;
a second semiconductor module having switching elements for switching over current supply to the coils of the second winding group;
a heat sink provided at an axial end of the electric motor portion on a side of the detection member and extending in the axial direction from the axial end of the electric motor portion, the heat sink having a first and a second module holding surfaces to which the first semiconductor module and the second semiconductor module are respectively attached;
motor wires of a first power control system, which are located at radial outward positions of the first semiconductor module, and which are composed of a first motor wire, a second motor wire and a third motor wire, wherein each one of the motor wires electrically connects each one of the coils of the first winding group to the first semiconductor module; and
motor wires of a second power control system, which are located at radial outward positions of the second semiconductor module, and which are composed of a fourth motor wire, a fifth motor wire and a sixth motor wire, wherein each one of the motor wires electrically connects each one of the coils of the second winding group to the second semiconductor module,
wherein the motor wires of the first power control system and the motor wires of the second power control system are arranged in a concentric pattern on a virtual plane perpendicular to an axis line of the electric motor portion,
wherein each of the motor wires of the first power control system and each of the motor wires of the second power control system are symmetrically arranged with respect to the detection member on the virtual plane,
wherein the first motor wire and the third motor wire, which are located at both sides of the second motor wire in a circumferential direction of the electric motor portion, are asymmetrically located to each other with respect to the second motor wire on the virtual plane,
wherein the fourth motor wire and the sixth motor wire, which are located at both sides of the fifth motor wire in the circumferential direction of the electric motor portion, are asymmetrically located to each other with respect to the fifth motor wire on the virtual plane,
wherein the first motor wire and the fourth motor wire, which are symmetrically arranged with respect to the detection member, form a first motor-wire pair,
wherein the second motor wire and the fifth motor wire, which are symmetrically arranged with respect to the detection member, form a second motor-wire pair,
wherein the third motor wire and the sixth motor wire, which are symmetrically arranged with respect to the detection member, form a third motor-wire pair,
wherein each one of the first to the third motor wires is electrically connected to each one of the coils of the first winding group,
wherein each one of the fourth to the sixth motor wires is electrically connected to each one of the coils of the second winding group, and
wherein the first semiconductor module and the second semiconductor module are configured to supply a phase of current to the coils of the first winding group that is different from a phase of current supplied to the coils of the second winding group by a predetermined electrical angle, so that the current flowing through each one of the first to the third motor wires is in a different phase from the current flowing through each one of the fourth to the sixth motor wires, in each pair of the first to the third motor-wire pairs.

2. The electrical driving device according to claim 1, wherein
each of the first to the third motor wires is located at a radial-outward position of the first module holding surface of the heat sink,
each of the fourth to the sixth motor wires is located at a radial-outward position of the second module holding surface of the heat sink,
the second motor wire is located at a position displaced from a center line in the circumferential direction of the electric motor portion, wherein the center line passes through a center of the first module holding surface and extends in a radial outward direction perpendicular to the first module holding surface, and
the fifth motor wire is located at a position displaced from a center line in the circumferential direction of the electric motor portion, wherein the center line passes through a center of the second module holding surface and extends in a radial outward direction perpendicular to the second module holding surface.

3. The electrical driving device according to claim 1, wherein
the first motor wire is connected to the V1 coil, the second motor wire is connected to the U1 coil and the third motor wire is connected to the W1 coil, and
the fourth motor wire is connected to the U2 coil, the fifth motor wire is connected to the W2 coil and the sixth motor wire is connected to the V2 coil.

4. The electrical driving device according to claim 1, wherein
the rotational angle sensor is composed of an element having magnetoresistance effect, and density of magnetic flux at the rotational angle sensor is between 20 [mT] and 50 [mT].

5. The electrical driving device according to claim 1, wherein the phase of current to the coils of the first winding group is 30 degrees different from a phase of current supplied to the coils of the second winding group.

6. The electrical driving device according to claim 1, wherein
the U1 coil and the U2 coil form a first phase-coil group, the V1 coil and the V2 coil form a second phase-coil group, and the W1 coil and the W2 coil form a third phase-coil group, and
in each of the motor-wire pairs, one of the motor wires is connected to one of the coils belonging to one of the phase-coil groups, while the other of the motor wires is connected to one of the coils belonging to a different phase-coil group.

7. The electrical driving device according to claim 6, wherein
the first motor wire is connected to the V1 coil, the second motor wire is connected to the U1 coil and the third motor wire is connected to the W1 coil,
the fourth motor wire is connected to the U2 coil, the fifth motor wire is connected to the W2 coil and the sixth motor wire is connected to the V2 coil,
a circumferential distance between the first motor wire connected to the V1 coil and the second motor wire connected to the U1 coil is smaller than a circumferential distance between the second motor wire connected to the U1 coil and the third motor wire connected to the W1 coil, and
a circumferential distance between the fourth motor wire connected to the U2 coil and the fifth motor wire connected to the W2 coil is smaller than a circumferential distance between the fifth motor wire connected to the W2 coil and the sixth motor wire connected to the V2 coil.

8. An electrical driving device comprising:
an electric motor portion having a stator on which a first winding group of a three-phase winding and a second winding group of the three-phase winding are wound, a rotor rotatably arranged with respect to the stator, and a shaft rotatable together with the rotor, wherein the first winding group is composed of a U1 coil, a V1 coil and a W1 coil, and the second winding group is composed of a U2 coil, a V2 coil and a W2 coil;
a detection member provided at one of axial ends of the shaft;
a rotational angle sensor provided at a position opposing to the detection member in an axial direction of the shaft and for detecting a rotational position of the shaft and the rotor by detecting a change of magnetic field generated by the detection member;
a first semiconductor module having switching elements for switching over current supply to the coils of the first winding group;
a second semiconductor module having switching elements for switching over current supply to the coils of the second winding group;
a heat sink provided at an axial end of the electric motor portion on a side of the detection member and extending in the axial direction from the axial end of the electric motor portion, the heat sink having a first and a second module holding surfaces to which the first semiconductor module and the second semiconductor module are respectively attached;
motor wires of a first power control system, which are located at radial outward positions of the first semiconductor module, and which are composed of a first motor wire, a second motor wire and a third motor wire, wherein each one of the first to the third motor wires electrically connects each one of the coils of the first winding group to the first semiconductor module; and
motor wires of a second power control system, which are located at radial outward positions of the second semiconductor module, and which are composed of a fourth motor wire, a fifth motor wire and a sixth motor wire, wherein each one of the fourth to the sixth motor wires electrically connects each one of the coils of the second winding group to the second semiconductor module,
wherein the motor wires of the first power control system and the motor wires of the second power control system are arranged in a concentric pattern on a virtual plane perpendicular to an axis line of the electric motor portion,
wherein each of the motor wires of the first power control system and each of the motor wires of the second power control system are symmetrically arranged with respect to the detection member on the virtual plane,
wherein the first motor wire and the third motor wire, which are located at both sides of the second motor wire in a circumferential direction of the electric motor portion, are asymmetrically located to each other with respect to the second motor wire on the virtual plane, and
wherein the fourth motor wire and the sixth motor wire, which are located at both sides of the fifth motor wire in the circumferential direction of the electric motor portion, are asymmetrically located to each other with respect to the fifth motor wire on the virtual plane,
wherein the first motor wire and the fourth motor wire, which are symmetrically arranged with respect to the detection member, form a first motor-wire pair,
wherein the second motor wire and the fifth motor wire, which are symmetrically arranged with respect to the detection member, form a second motor-wire pair,
wherein the third motor wire and the sixth motor wire, which are symmetrically arranged with respect to the detection member, form a third motor-wire pair, and
wherein in each of at least two motor-wire pairs, the first semiconductor module and the second semiconductor module are configured to supply current to the coil of the first winding group connected to the motor wire of the first power control system belonging to one of the motor-wire pairs and to supply current to the coil of the second winding group connected to the motor wire of the second power control system belonging to the same one of the motor-wire pairs, and wherein a phase of the current to the coil of the first winding group is different from a phase of the current to the coil of the second winding group.

9. The electrical driving device according to claim 8, wherein
each of the first to the third motor wires is located at a radial-outward position of the first module holding surface of the heat sink,
each of the fourth to the sixth motor wires is located at a radial-outward position of the second module holding surface of the heat sink,
the second motor wire is located at a position displaced from a center line in the circumferential direction of the electric motor portion, wherein the center line passes through a center of the first module holding surface and extends in a radial outward direction perpendicular to the first module holding surface, and the fifth motor wire is located at a position displaced from a center line in the circumferential direction of the electric motor portion, wherein the center line passes through a center of the second module holding surface and extends in a radial outward direction perpendicular to the second module holding surface.

10. The electrical driving device according to claim 8, wherein current flowing through the U1 coil is in a different phase from current flowing through the U2 coil, current flowing through the V1 coil is in a different phase from current flowing through the V2 coil, and current flowing through the W1 coil is in a different phase from current flowing through the W2 coil.

11. The electrical driving device according to claim 10, wherein the current flowing through each one of the first to the third motor wires is in the different phase from the current flowing through each one of the fourth to the sixth motor wires, in each pair of the first to the third motor-wire pairs.

12. The electrical driving device according to claim 11, wherein the first motor wire is connected to the V1 coil, the second motor wire is connected to the U1 coil and the third motor wire is connected to the W1 coil, and the fourth motor wire is connected to the U2 coil, the fifth motor wire is connected to the W2 coil and the sixth motor wire is connected to the V2 coil.

13. The electrical driving device according to claim 8, wherein the U1 coil and the U2 coil form a first phase-coil group, the V1 coil and the V2 coil form a second phase-coil group, and the W1 coil and the W2 coil form a third phase-coil group, and in each of the above two motor-wire pairs, one of the motor wires is connected to one of the coils belonging to one of the phase-coil groups, while the other of the motor wires is connected to one of the coils belonging to a different phase-coil group.

* * * * *